(12) United States Patent
Huang et al.

(10) Patent No.: US 7,561,979 B2
(45) Date of Patent: Jul. 14, 2009

(54) DEVICE AND METHOD FOR CALIBRATING DATA PROCESSING APPARATUS BY TUNING FIRMWARE TRIM VALUE

(75) Inventors: Hsiang-Sung Huang, Hsinchu County (TW); Kuo-Pin Lan, Hsinchu County (TW); Yuan-Chung Lee, Tainan (TW); Chien-Ming Chen, Hsin-Chu (TW); Pin-Huan Hsu, Taipei (TW)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 11/747,185

(22) Filed: May 10, 2007

(65) Prior Publication Data
US 2008/0281544 A1 Nov. 13, 2008

(51) Int. Cl.
*G01R 35/00* (2006.01)
(52) U.S. Cl. ...................................................... 702/107
(58) Field of Classification Search ................. 702/107
See application file for complete search history.

(56) References Cited

U.S. PATENT DOCUMENTS

2004/0254756 A1* 12/2004 Strittmatter ................. 702/117
2007/0203661 A1*  8/2007 John et al. ..................... 702/85

* cited by examiner

*Primary Examiner*—Bryan Bui
*Assistant Examiner*—Jonathan Teixeira Moffat
(74) *Attorney, Agent, or Firm*—Winston Hsu

(57) ABSTRACT

A method for calibrating a data processing apparatus to set a target firmware trim value is disclosed. The data processing apparatus is for converting a non-test pattern to a non-test output according to the target firmware trim value under a normal mode. The method includes: driving the data processing apparatus to convert a test pattern into a test output according to a test firmware trim value received under a calibration mode; and analyzing the test output to tune the test firmware trim value outputted to the data processing apparatus, and controlling the data processing apparatus to store a specific test firmware trim value as the target firmware trim value when an analysis result of the test output generated in reference to the specific test firmware trim value indicates that a predetermined criterion is met.

6 Claims, 4 Drawing Sheets

DEVICE AND METHOD FOR CALIBRATING DATA PROCESSING APPARATUS BY TUNING FIRMWARE TRIM VALUE

BACKGROUND

This invention relates to calibrating an output signal level of a target integrated circuit, and more particularly, to a calibration scheme applied to a data processing apparatus (e.g., an MPEG chip) for determining a target firmware trim value set to the data processing apparatus.

The process of fabricating integrated circuits (ICs) on a semiconductor substrate, such as a silicon wafer, is highly complex and consists of a large number of steps. Each step involves many process parameters that must be tightly controlled in order to obtain consistent and accurate results. There are, however, physical factors that may cause unintentional deviations in the process at any step.

The deviations in the process may be a function of time that is between successive wafers, or between various parts of any wafer, or both. When any of these process deviations becomes excessive, singly or in combination, the actual characteristics of the fabricated ICs are deviated from the ideal characteristics. For example, an MPEG chip implemented in multimedia playback apparatuses is typically formed of integrated semiconductor components. However, as known to those skilled in this art, because process characteristics are very difficult to control and keep stable, so that even within a single process, components fabricated within the same process will exhibit different electrical characteristics, causing characteristics of the components to vary greatly from original design requirements. Suppose that the MPEG chip is designed for outputting a TV-compliant signal, such as a composite video signal (or referred to as a CVBS signal), to drive a TV set to display the desired images thereon. Therefore, a video digital-to-analog converter (DAC) is implemented within the MPEG chip to convert decoded/processed digital video data into the composite video signal. Additionally, an external video buffer, equipped with a predetermined driving strength, is coupled to the MPEG chip for buffering the composite video signal outputted from the video DAC to the destination TV set. However, due to the process variation, circuit component accuracy, and manufacture deviation, the video output level deviation occurs. Taking the well-known NTSC composite video signal for example, a white level is defined to be equal to 100 IRE (e.g., 1V), and the sync tip level is defined to be −40 IRE (e.g., 0V). The unit of measurement for the amplitude is in terms of an IRE unit, where 140 IRE is representative of a peak-to-peak voltage of 1V. If the output signal amplitude is deviated from the desired level, the display quality of images shown on the TV set might be degraded greatly. As a result, there is a need for a calibration scheme that would compensate the MPEG chip, especially the video DAC implemented therein, for the undesired output signal amplitude deviation.

SUMMARY

It is therefore one of the objectives of the invention to provide a data processing apparatus capable of being compensated using a firmware trim value, a calibration system capable of calibrating a data processing apparatus by tuning a firmware trim value, and related calibration method thereof, to solve the above problem.

According to an embodiment of the invention, a calibration system is disclosed. The calibration system includes a data processing apparatus and a calibration apparatus. The data processing apparatus is for converting a test pattern into a test output according to a test firmware trim value received under a calibration mode, and is for converting a non-test pattern to a non-test output according to a target firmware trim value stored therein under a normal mode. The calibration apparatus is coupled to the data processing device for analyzing the test output to tune the test firmware trim value outputted to the data processing device, and for controlling the data processing device to store a specific test firmware trim value as the target firmware trim value when an analysis result of the test output generated in reference to the specific test firmware trim value indicates that a predetermined criterion is met.

According to an embodiment of the invention, a data processing apparatus is disclosed. The data processing apparatus includes a storage device for storing a target firmware trim value; and a data processing circuit, coupled to the storage device, for converting a test pattern into a test output according to a test firmware trim value received under a calibration mode, and for converting a non-test pattern to a non-test output according to the target firmware trim value stored therein under a normal mode, wherein the data processing circuit stores a specific test firmware trim value into the storage device as the target firmware trim value under the calibration mode.

According to an embodiment of the invention, a method for calibrating a data processing apparatus to set a target firmware trim value is disclosed. The method includes driving the data processing apparatus to convert a test pattern into a test output according to a test firmware trim value received under a calibration mode; and analyzing the test output to tune the test firmware trim value outputted to the data processing device, and controlling the data processing device to store a specific test firmware trim value as the target firmware trim value when an analysis result of the test output generated in reference to the specific test firmware trim value indicates that a predetermined criterion is met.

These and other objectives of the invention will no doubt become obvious to those of ordinary skill in the art after reading the following detailed description of the preferred embodiment that is illustrated in the various figures and drawings.

DETAILED DESCRIPTION

Certain terms are used throughout the following description and claims to refer to particular system components. As one skilled in the art will appreciate, manufacturers may refer to a component by different names.

This document does not intend to distinguish between components that differ in name but not function. In the following discussion and in the claims, the terms "including" and "comprising" are used in an open-ended fashion, and thus should be interpreted to mean "including, but not limited to . . . " The terms "couple" and "couples" are intended to mean either an indirect or a direct electrical connection. Thus, if a first device couples to a second device, that connection may be through a direct electrical connection, or through an indirect electrical connection via other devices and connections.

Figure 1:
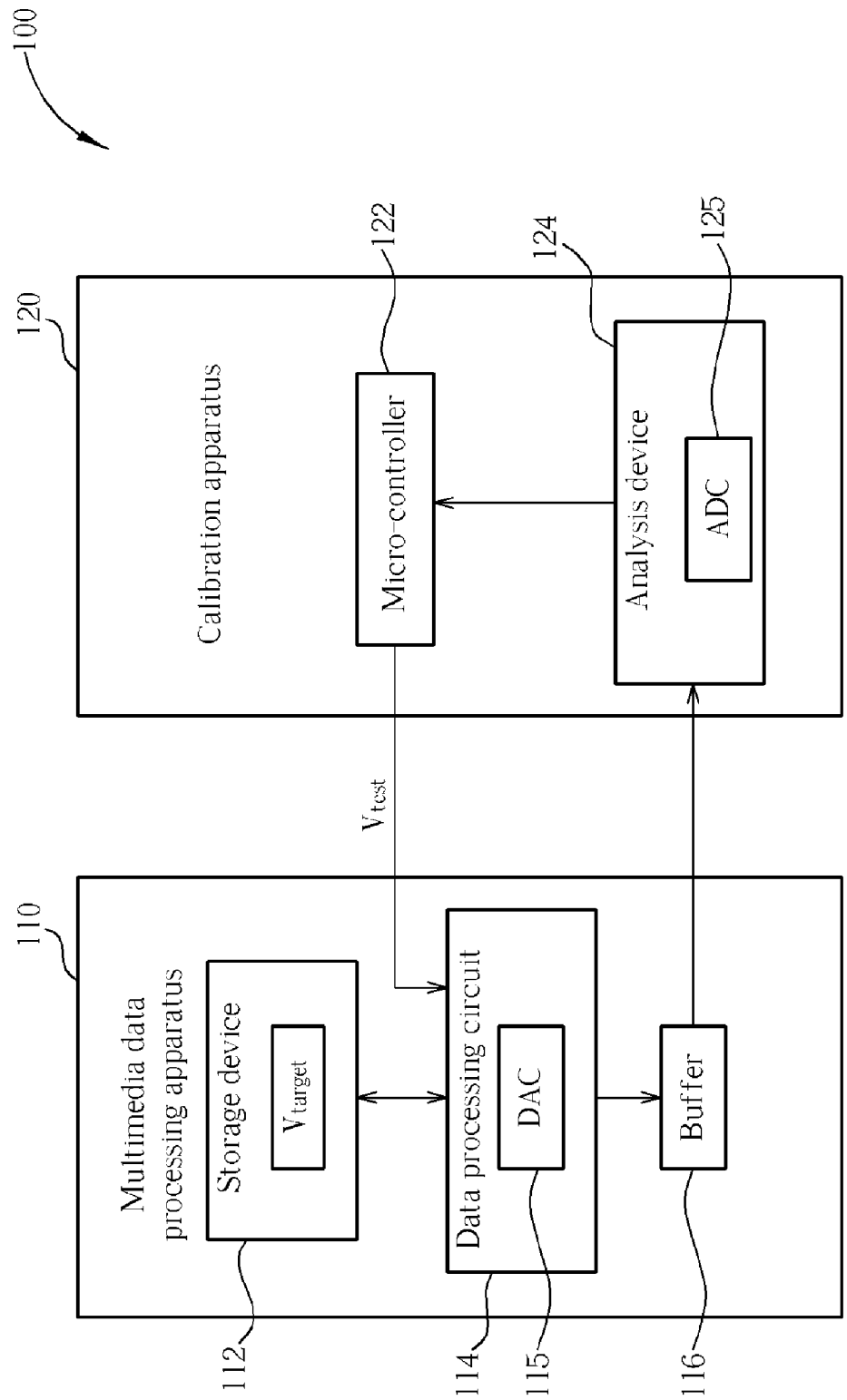
FIG. 1 is a block diagram illustrating a calibration system according to an embodiment of the invention.

Please refer to FIG. 1. FIG. 1 is a block diagram illustrating a calibration system 100 according to an embodiment of the invention. As shown in FIG. 1, the calibration system 100 includes a data processing apparatus (e.g., a multimedia data processing apparatus 110) and a calibration apparatus 120 used for calibrating characteristics of the data processing apparatus (i.e., the multimedia data processing apparatus 110). The multimedia data processing apparatus 110 contains a storage device 112, a data processing circuit 114 having a digital-to-analog converter (DAC) 115, and a buffer 116. The storage device 112 is used for storing a target firmware trim value $V_{target}$ referenced under a normal mode, the data processing circuit 114 is designed to convert a test pattern into a test output according to a test firmware trim value $V_{test}$ received under a calibration mode, and convert a non-test pattern to a non-test output according to the target firmware trim value $V_{target}$ under a normal mode, and the buffer 116 is designed to have a predetermined driving strength and implemented here to buffer outputs generated from the data processing circuit 114 to a destination electronic device (not shown) under the normal mode or the calibration apparatus 120 under the calibration mode. Regarding the calibration apparatus 120, it includes an analysis device 124 having an analog-to-digital converter (ADC) 125 and a micro-controller 122 operative to update the test firmware trim value $V_{test}$ according to an analysis result generated from the analysis device 124. In this embodiment, an RS232 port connection is established between the multimedia data processing apparatus 110 and the calibration apparatus 120 for firmware trim value transmission. However, this is not meant to be a limitation of the invention. The operation of the disclosed calibration scheme is detailed as below.

Suppose that the storage device 112 is implemented using a non-volatile storage, such a flash memory or EEPROM memory, the data processing circuit 114 is an MPEG chip having the DAC 115 serving as a video DAC to output a video signal (e.g., a CVBS signal or S-video signal), and the buffer 116 acts as a conventional video buffer used for buffering the video signal outputted from the MPEG chip to an electronic device under a normal mode and the calibration apparatus 120 under the calibration mode. When the calibration mode is activated, the data processing circuit 114 starts processing the above-mentioned test pattern (digital video data) to generate the test output (analog video signal) to the buffer 116 for signal buffering. The test pattern could be provided from reading a test optical disc or any available data sources. In the beginning, the micro-controller 122 will outputs an initial test firmware trim value $V_{test}$ to the data processing circuit 114 for setting the DAC 115 by firmware control means. That is, the DAC 115 is firstly tuned by the firmware execution of the data processing circuit 114 in reference to the initial test firmware trim value $V_{test}$ at the time when the calibration procedure begins. Therefore, under the control of the initial test firmware trim value $V_{test}$, the DAC 115 then converts the digital video data into the analog video signal fed into the following calibration apparatus 120 through the buffer 116. In this embodiment, the digital video data is defined for displaying an all-white image on a screen. However, this is only for illustrative purposes, and is not meant to be a limitation of the invention.

Figure 2:
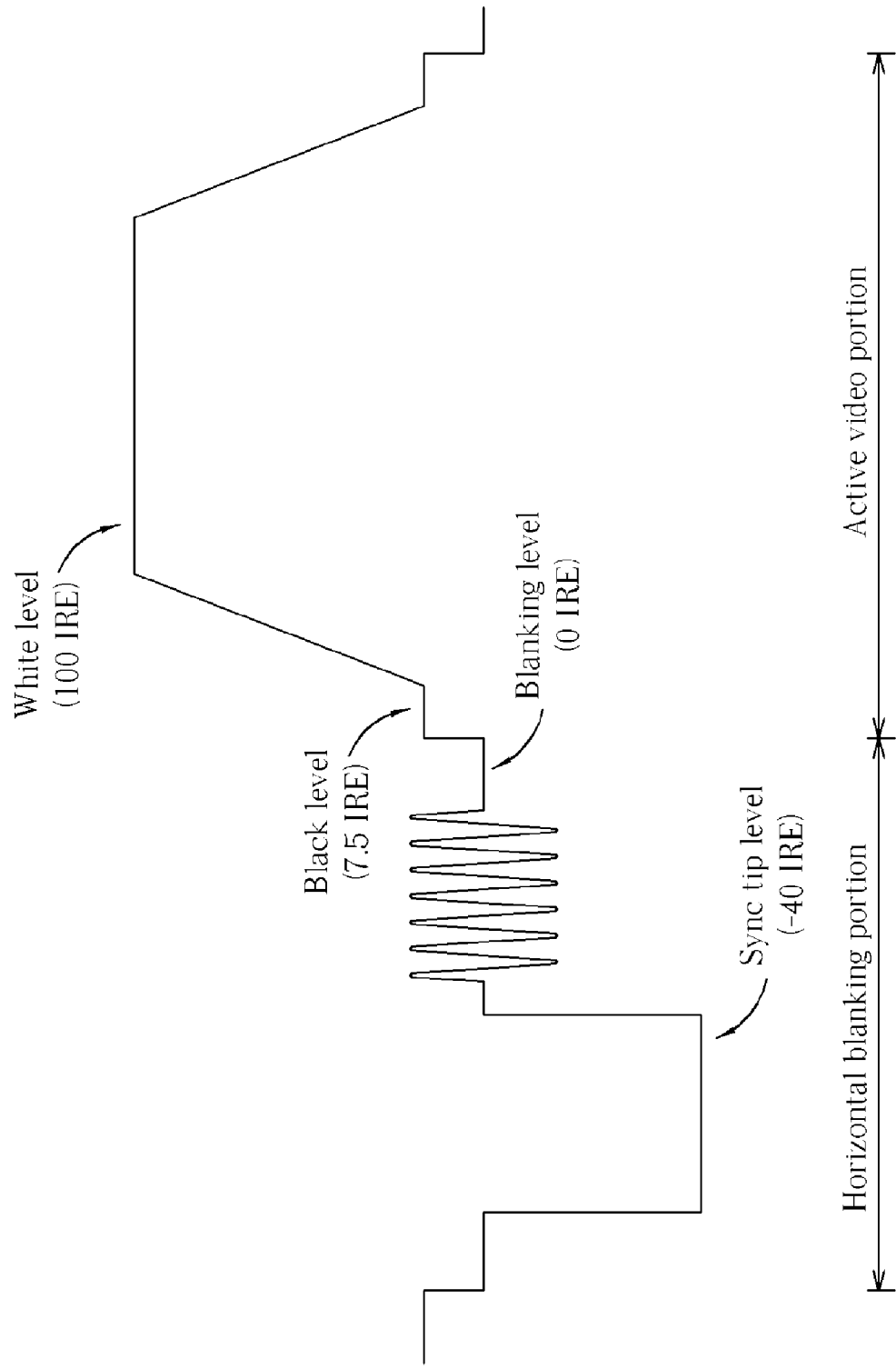
FIG. 2 is a waveform diagram of a test output generated from a digital-to-analog converter (DAC) shown in FIG. 1.

Please refer to FIG. 2. FIG. 2 is a waveform diagram of a test output generated from the DAC 115 shown in FIG. 1. This analog video signal is a CVBS signal including a horizontal blanking portion and an active video portion, wherein the active video portion keeps at the white level. For example, as one can see, the sync tip level is equal to −40 IRE (e.g., 0V), the blanking level is equal to 0 IRE, the black level is equal to 7.5 IRE, and the white level is equal to 100 IRE (e.g., 1V). Since the details of the CVBS signal are well defined in the conventional TV standard and known to those skilled in this art, further description is omitted here for brevity. The waveform shown in FIG. 2 is transmitted to the calibration apparatus 120 for further signal processing.

As mentioned above, the analysis device 124 is implemented to analyze the output from the multimedia data processing apparatus 110 and then output the analysis result to the micro-controller 122. In this embodiment, the analysis device 124 is equipped with an ADC 125 for sampling the CVBS signal shown in FIG. 2 to produce the required analysis result. In a case where a high-speed ADC 125 is implemented, the CVBS signal is sampled many times during one period corresponding to the sync tip level to generate a plurality of first sample values; additionally, the CVBS signal is also sampled many times during another period corresponding to the white level to generate a plurality of second sample value. In this way, the analysis result including at least the first sample values and the second sample values is outputted to the micro-controller 122. Next, the micro-controller 122 processes the received analysis result to check if a predetermined criterion is met. In this case where the high-speed ADC 125 is adopted, the micro-controller 122 runs a digital filtering upon the incoming analysis result containing the first sample values corresponding to the sync tip level and the second sample values corresponding to the white level to minimize noise interference. For instance, the micro-controller 122 computes a first average value A of the first sample values and a second average value B of the second sample values, and then determines a difference value C (C=B−A) according to the first average value A and the second average value B. After obtaining the difference value C, the micro-controller 122 compares the difference value C with a reference value to determine if the predetermined criterion is met. Referring to FIG. 2, it is clear that the ideal magnitude difference between the white level and the sync tip level is equal to 140 IRE, i.e., a peak-to-peak voltage of 1V. In other words, the ideal signal magnitude of the sync tip level is equal to 0V, and the ideal magnitude of the white level is equal to 1V. If the actual magnitude difference between the measured white level and the measured sync tip level is equal to 1V, it is guaranteed that the actual white level is accurate. Therefore, the above reference value is pre-defined according to the ideal magnitude difference between the white level and the sync tip level. The predetermined criterion is determined to be satisfied when the difference between the difference value C and the reference value falls in a predetermined range or the difference value C is equal to the reference value, depending upon design requirements. If the predetermined criterion is not satisfied, the micro-controller 122 will update the test firmware trim value $V_{test}$ fed into the data processing circuit 114 to thereby change digital-to-analog conversion characteristics. The calibration applied to the DAC 115 is detailed as below.

Figure 3:
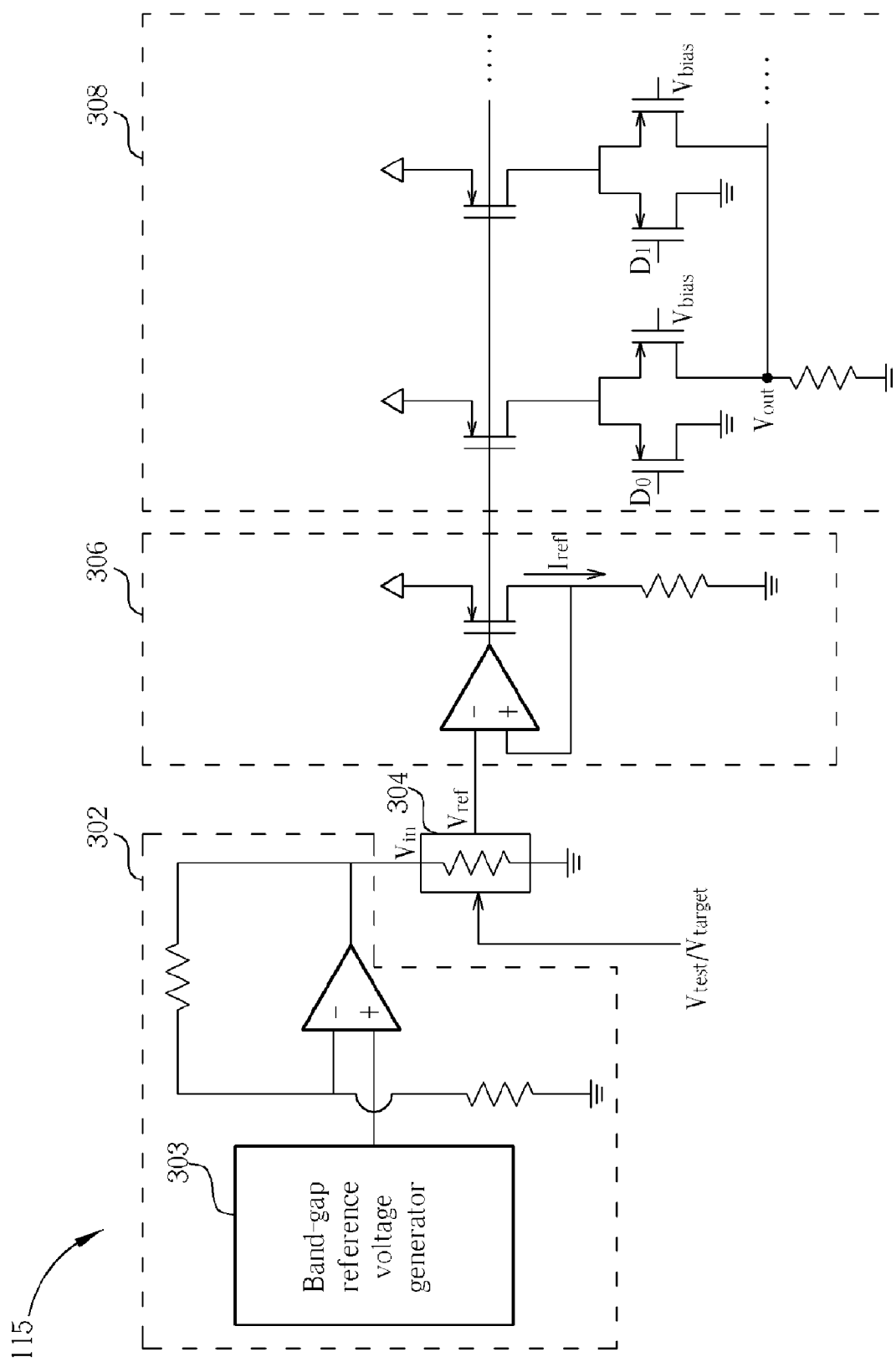
FIG. 3 is a circuit diagram of the DAC shown in FIG. 1 according to an embodiment of the invention.

Please refer to FIG. 3. FIG. 3 is a circuit diagram of the DAC 115 shown in FIG. 1 according to an embodiment of the invention. In this embodiment of the invention, the DAC 115 embedded in the data processing circuit 114 (e.g., an MPEG chip) is implemented using a current steering DAC configuration. As shown in FIG. 3, the current steering DAC 115 comprises a voltage provider 302 for providing a supply voltage $V_{in}$, where the voltage provider 302 includes a band-gap reference voltage generator 303 to supply a stable voltage output. Additionally, the current steering DAC 115 includes a controllable voltage divider 304, coupled to the voltage provider 302 and controlled by a firmware trim value (the target firmware trim value $V_{target}$ or the test firmware trim value $V_{test}$), for dividing the supply voltage $V_{in}$ to output a reference voltage $V_{ref}$ according to the firmware trim value; a reference current provider 306, coupled to the controllable voltage divider 304, for generating a reference current $I_{ref}$ according to the reference voltage $V_{ref}$; and a converting circuit 308, coupled to the reference current provider 306 and the digital data (e.g., data bits $D_0$ and $D_1$), for converting the digital data into the analog signal $V_{out}$ according to the reference current $I_{ref}$. The circuit configuration of the converting circuit 308 is for illustrative purposes. Any converting circuit that refers to the reference current $I_{ref}$ for performing the required digital-to-analog conversion can be adopted. Since the operations and circuit configurations of the voltage provider 302, the reference current provider 306, and the converting circuit 308 are well know to those skilled in the field of the current steering DAC, further description is omitted for the sake of brevity.

Compared to the conventional current steering DAC, the DAC 115 includes the controllable voltage divider 304 operative to fine tune the reference current $I_{ref}$, thereby adjusting the analog output of the same digital data. For example, if the micro-controller 122 identifies that the difference value C is greater than the reference value, meaning that the analog output level is too high for the current test firmware trim value referred to for calibrating the DAC 115, the micro-controller 122 tunes the test firmware trim value $V_{test}$ to make the DAC 115 have a decreased reference current $I_{ref}$; similarly, if the micro-controller 122 identifies that the difference value C is less than the reference value, meaning that the analog output level is too low for the current test firmware trim value referred to for calibrating the DAC 115, the micro-controller 122 tunes the test firmware trim value $V_{test}$ to make the DAC 115 have an increased reference current $I_{ref}$. In one embodiment of the invention, the micro-controller 122 selects one of a plurality of preset trim values to update the test firmware trim value according to a comparison result of the difference value C and the reference value. For example, there are sixteen different preset trim values available for setting the test firmware trim value. The preset trim values include one default trim value to be used as an initial value set to the test firmware trim value $V_{test}$ in the beginning of the calibration procedure. Therefore, the micro-controller 122 selects the default trim value to test if the predetermined criterion is satisfied. If the predetermined criterion is not satisfied, the micro-controller 122 selects another value from the preset trim values to test if the predetermined criterion could be satisfied. In other words, the above searching algorithm is equivalent to testing the preset trim values one by one until a target firmware trim value is found. If all of the preset trim values have been tested and no target firmware trim value is found, it is possible that some unexpected interferences occur or the calibration system 100 becomes unstable during the calibration procedure. Therefore, the calibration procedure could be restarted, if necessary, to search for the target firmware trim value again. It should be noted that the invention is not limited to above-mentioned searching operation. For example, other conventional algorithms can be implemented to search for or determine the target firmware trim value. Once the predetermined criterion is satisfied, the current test firmware trim value $V_{test}$ is stored into the storage device 112 (e.g., a flash memory) as the target firmware trim value $V_{target}$ referenced under a normal mode. When the multimedia data processing apparatus 110 is operated under a normal mode, the analog output deviation is minimized or eliminated due to the DAC 115 compensated using the target firmware trim value $V_{target}$ found in the preceding calibration procedure.

Please note that the circuit configuration shown in FIG. 3 is only for illustrative purposes, and is not a limitation of the invention. After reading above description, a person skilled in this art can readily appreciate that other DAC configurations are feasible for the disclosed calibration scheme. For example, any DAC capable of adjusting its analog output level in response to a firmware trim value set according to the disclosed calibration scheme can be adopted in the data processing circuit 114. Moreover, the invention is not limited to use a high-speed ADC for sampling the analog output from the multimedia data processing apparatus 110. In another case where a regular ADC 125 is implemented, it is possible that only one first sample value is obtained during a period corresponding to the sync tip level and only one second sample value is obtained during another period corresponding to the white level. Next, the micro-controller 122 calculates a difference value using the first sample value and second sample value directly, and then this difference value is compared with a reference value to verify if a predetermined criterion is met. Though the aforementioned digital filtering is not performed to make the calibration process noise-resistant, the same objective of calibrating the DAC 115 by tuning the firmware trim value in reference to the analysis result from the analysis device 124 is achieved. In above exemplary embodiment, the selected signal levels to be monitored are sync tip level and white level. However, this is not meant to be a limitation of the invention. In other embodiments, two signal levels defined to have fixed and known voltage levels can be monitored for tuning the firmware trim value. For instance, one of the possible combinations of the white level, the black level, the blanking level, and the sync tip level can be selected for monitoring the analog output deviation, where the above-mentioned reference value should be properly set to meet the corresponding design requirements.

In the invention, the multimedia data processing apparatus 110 is disposed on an optical disc playback device (e.g., a DVD player or DVD recorder) or a set-top box. Before the product is shipped to the market, the above calibration procedure is performed to minimize or eliminate the analog output deviation. It should be noted that the analog output deviation is not solely induced by the imperfection of the DAC 115. Since the calibration apparatus 120 fine tunes the firmware trim value based upon the analog output of the multimedia data processing apparatus 110, calibrating the DAC 115 is equivalent to compensating the multimedia data processing apparatus 110 for an overall output error due to semiconductor process variation, circuit component variation, and manufacture deviation. In other words, the calibration scheme of the invention is capable of estimating the analog output error of the overall system, and then compensating the whole system for the measured error by tuning the DAC 115 only. By using the automatic calibration scheme of the invention, the calibration efficiency is improved greatly, boosting the yield rate of the product manufacture accordingly.

Please note that the calibration apparatus 120 shown in FIG. 1 is external equipment for calibrating a plurality of multimedia data processing apparatuses 110 during the product manufacture. However, in other embodiments, the calibration apparatus 120 could be integrated with the multimedia data processing apparatus 110. That is, both the calibration apparatus 120 and the multimedia data processing apparatus 110 are disposed on an optical disc playback device or a set-top box. Therefore, the calibration apparatus 120 can be enabled to calibrate the multimedia data processing apparatus 110 anytime and anywhere. This still obeys the spirit of the invention, and falls in the scope of the invention.

In the above exemplary embodiment, the data processing circuit 114 is an MPEG chip capable of outputting an analog video output (e.g., a CVBS signal or S-video signal) through the DAC 115 implemented therein. However, after reading above disclosure, it is readily understood that the disclosed calibration scheme, in another embodiment, can be used for calibrating the DAC 115 (e.g., an audio DAC) for the analog audio output deviation. For example, the test pattern is a digital audio data, and the test output is an analog audio signal having specific signal levels that can be monitored for identifying the audio output deviation. The similar objective of calibrating the DAC 115 by tuning the firmware trim value according to the analysis result generated from sampling an output of the data processing circuit 114 is achieved. This alternative design still obeys the spirit of the invention.

Figure 4:
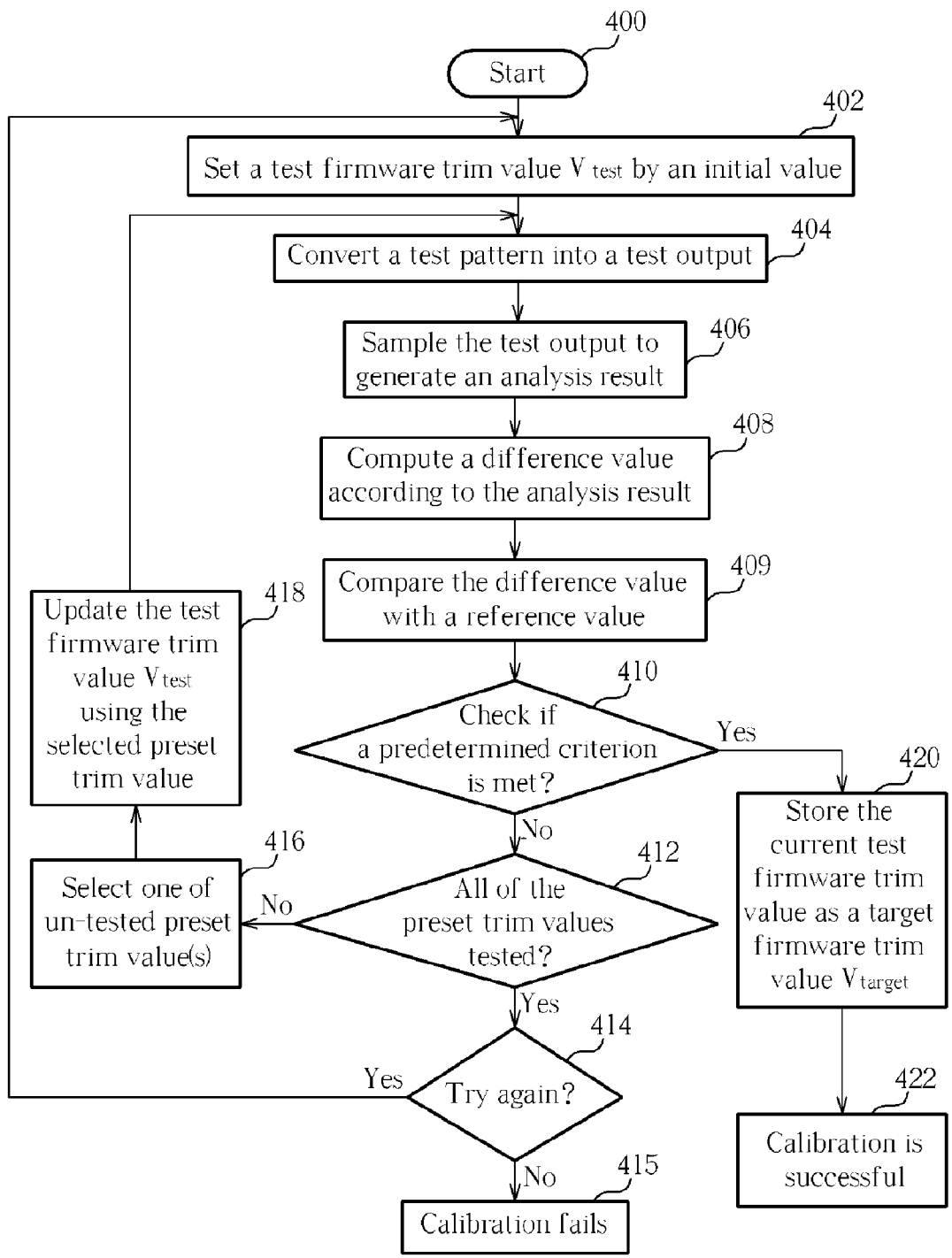
FIG. 4 is a flowchart illustrating a calibration method according to an embodiment of the invention.

Please refer to FIG. 4. FIG. 4 is a flowchart illustrating a calibration method according to an embodiment of the invention. The calibration method is performed by the calibration system 100 shown in FIG. 1, and summarized as follows.

Step 400: Start.

Step 402: The micro-controller 122 sets the test firmware trim value $V_{test}$ by an initial value (i.e., a default trim value).

Step 404: The DAC 115 converts a test pattern (e.g., a digital video data) into a test output (e.g., an analog video output).

Step 406: The ADC 125 samples the test output (e.g., a CVBS signal) to generate an analysis result including one or more first sample values sampled during a first period corresponding to a first predetermined signal level (e.g., a sync tip level) and one or more second sample values sampled during a second period corresponding to a second predetermined signal level (e.g., a white level).

Step 408: The micro-controller 122 runs a digital filtering upon the incoming analysis result and computes a difference value according to the analysis result from the ADC 125.

Step 409: The micro-controller 122 compares the difference value with a reference value.

Step 410: The micro-controller 122 checks if a predetermined criterion is met. If the predetermined criterion is met, go to step 420; otherwise, go to step 412.

Step 412: Are all of the preset trim values tested? If yes, go to step 414; otherwise, go to step 416.

Step 414: Try again? If yes, go to step 402; otherwise, go to step 415.

Step 415: Calibration fails.

Step 416: Select one of untested preset trim values.

Step 418: The micro-controller 122 updates the test firmware trim value $V_{test}$ using the selected preset trim value. Go to step 404.

Step 420: The micro-controller 122 indicates the data processing circuit 114 to store the current test firmware trim value into the storage device 112 as the target firmware trim value $V_{target}$ referenced under a normal mode.

Step 422: Calibration is successful.

Since the operation of the calibration system 100 has been detailed above, further description related to the steps shown in the flow of FIG. 4 is omitted here for the sake of brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A calibration system, comprising:
   a data processing apparatus, for converting a test pattern into a test output according to a test firmware trim value received under a calibration mode, and for converting a non-test pattern to a non-test output according to a target firmware trim value stored therein under a normal mode, wherein the test output is an analog signal; and
   a calibration apparatus, coupled to the data processing device, for calibrating the data processing apparatus, the calibration apparatus analyzing the test output to tune the test firmware trim value outputted to the data processing device, and for controlling the data processing device to store a specific test firmware trim value as the target firmware trim value when an analysis result of the test output generated in reference to the specific test firmware trim value indicates that a predetermined criterion is met, the calibration apparatus comprising:
   an analysis device, for analyzing the test output to generate the analysis result, the analysis device comprising an analog-to-digital converter (ADC) for sampling the analog signal to generate the analysis result; and
   a micro-controller, coupled to the analysis device, for processing the analysis result to adjust the test firmware trim value;
   wherein the analysis result outputted from the ADC includes at least a first sample value sampled during a first period of the analog signal and at least a second sample value sampled during a second period of the analog signal; and the micro-controller determines a difference value according to at least the first sample value and the second sample value, and then compares the difference value with a reference value to determine if the predetermined criterion is met.

2. The calibration system of claim 1, wherein the analysis result includes a plurality of first sample values and a plurality of second sample values; and the micro-controller further computes a first average value of the first sample values and a second average value of the second sample values, and then determines the difference value according to the first average value and the second average value.

3. The calibration system of claim 1, wherein the analog signal is a television signal, the first period corresponds to a sync tip level, and the second period corresponds to a white level.

4. A method for calibrating a data processing apparatus to set a target firmware trim value, the data processing apparatus converting a non-test pattern to a non-test output according to the target firmware trim value under a normal mode, the method comprising:
   driving the data processing apparatus to convert a test pattern into a test output according to a test firmware trim value received under a calibration mode, wherein the test output is an analog signal; and
   analyzing the test output to tune the test firmware trim value outputted to the data processing apparatus, comprising:
   performing an analog-to-digital conversion to sample the analog signal for generating an analysis result; and
   processing the analysis result to update the test firmware trim value continuously until a predetermined criterion is met; and
   controlling the data processing device to store a specific test firmware trim value as the target firmware trim value when the analysis result of the test output generated in reference to the specific test firmware trim value indicates that the predetermined criterion is met;

wherein the analysis result includes at least a first sample value sampled during a first period of the analog signal and at least a second sample value sampled during a second period of the analog signal; and the step of processing the analysis result to update the test firmware trim value continuously until the predetermined criterion is met comprises:

determining a difference value according to at least the first sample value and the second sample value; and comparing the difference value with a reference value to determine if the predetermined criterion is met.

5. The method of claim 4, wherein the analysis result includes a plurality of first sample values and a plurality of second sample values; and the step of determining the difference value comprises:

computing a first average value of the first sample values and a second average value of the second sample values; and determining the difference value according to the first average value and the second average value.

6. The method of claim 4, wherein the analog signal is a television signal, the first period corresponds to a sync tip level, and the second period corresponds to a white level.

* * * * *